W. A. PETERS.
ATTACHMENT FOR PHOTOGRAPHIC CAMERAS.
APPLICATION FILED JUNE 28, 1915.

1,265,371.

Patented May 7, 1918.
2 SHEETS—SHEET 2.

Witnesses:
Mason H. Jones
Geo. H. Frederichsen

Inventor:
William A. Peters
By Rudolph Jm Fox
Atty.

UNITED STATES PATENT OFFICE.

WILLIAM A. PETERS, OF CHICAGO, ILLINOIS, ASSIGNOR TO INTERNATIONAL PATENT LICENSING CORPORATION, OF CHICAGO, ILLINOIS, A CORPORATION OF DELAWARE.

ATTACHMENT FOR PHOTOGRAPHIC CAMERAS.

1,265,371.   Specification of Letters Patent.   Patented May 7, 1918.

Application filed June 23, 1915. Serial No. 36,892.

*To all whom it may concern:*

Be it known that I, WILLIAM A. PETERS, citizen of the United States, residing at Chicago, in the county of Cook and State of Illinois, have invented certain new and useful Improvements in Attachments for Photographic Cameras; and I do hereby declare the following to be a full, clear, and exact description of the invention, such as will enable others skilled in the art to which it appertains to make and use the same.

This invention relates to improvements in photographic cameras, and particularly to that type of camera which has become known to the public as the folding pocket kodak, the invention being however applicable to all bellows cameras.

The several objects of the invention are, first to provide a camera in which the lens board is freely adjustable vertically with respect to its carriage in a very simple, easily operative and convenient manner to enable such vertical adjustment to be quickly and easily effected.

A further object of the invention is to provide a carriage for the lens board of a camera which is freely movable on a guideway therefor without necessitating the operation by the user of a clutch for engaging and disengaging such guide-way to maintain said lens board in any given position relative to the film-plane.

A further essential object of the invention is to provide a guide-way for the carriage of the lens board which is equipped with a stop for primarily positioning the said lens board relative to the film plane to adapt the camera for instantaneously taking pictures at the maximum focal range or focal length for which the camera is adapted and in which auxiliary means are associated with said stop for varying the position of the latter while engaged with said carriage for further adjusting the position of the lens board relative to the film plane to focus the camera for taking pictures at less than the maximum focal range or length of the instrument.

A further essential object of the invention is to provide adjusting means for the stop and carriage engaged therewith which is quickly and easily operated for adjusting the focus of the camera, to accord with the distance therefrom of objects to be photographed, with the utmost speed and accuracy with relation to fixed range-points associated with said adjusting means.

A further essential object of the invention is to provide means for adjusting the position of the carriage and lens board on the guides independently of the fixed range points associated with said adjusting means whereby said lens board may be positioned intermediate of the positions determined by consecutive range points.

A further essential object of the invention is to provide adjusting means as aforesaid so associated with the carriage and the aforesaid stop for engaging the latter whereby, upon forcibly manually disengaging the carriage from said stop, the said adjusting means will be released from engagement with the fixed portion or portions of the guide-way for automatically effecting the return of the stop to the initial or primary position whereupon by again moving the carriage outwardly on said guides into engagement with said stop it will in all instances, assume the initial or primary position for adapting the camera for photographing objects at maximum range.

A further object of the invention is to provide a stop for the lens-board carriage and means for adjusting the position of the latter to vary the position of the lens-board relatively to the film plane, in which the said stop and said adjusting means are normally disengaged from each other and are thrown into engaging relation with each other automatically as the lens-board carriage becomes engaged with said stop.

A further essential object of the invention is to provide a lens-board carriage movable on guideways or rails equipped with stops, and in which said carriage is equipped with stop engaging means movably mounted thereon, and with means movable relatively to said carriage for actuating said stop engaging means to release the same from engagement with said stops preparatory to moving the carriage in either direction.

A further object of the invention is to provide means as set forth in the preceding paragraph equipped with digitally engageable means adapted to be digitally engaged to impart movement to the carriage in the direction in which said means are moved relatively to said carriage to initially actuate the particular stop engaging means then engaged with a stop to release the latter.

A further object of the invention is to provide a carriage for the lens board of a camera equipped with a manually operable member movable relatively to the carriage for automatically throwing a stop-engaging member out of engaging relation to the stop upon imparting movement to the carriage inwardly or in a direction to collapse the bellows, and which, by reverse movement of the carriage, offers no obstacle to the engagement by said stop of the said stop-engaging member.

Other objects of the invention will appear from the following specification.

In the drawings illustrating a suitable embodiment of the invention I have shown only that portion of a camera which carries the guide-way or rails on which the carriage for the lens board or plate is supported, one portion carrying a part of said guide-way being hinged to the bottom wall of the camera housing carrying the other part of said guide-way and constituting a door for closing the camera housing in the usual and well-known manner.

In said drawings:

Figure —1— is a fragmentary detail perspective view of the aforesaid portion of a camera of the type specified carrying the outer end portion of the guide-way for the carriage of the lens board, said carriage and a portion of the bellows being shown.

Fig. —2— is a fragmentary detail top plan view of the guide-way and the stop for the carriage and means for adjusting the position of said stop and carriage relatively to the guide-ways or rails for the latter.

Fig. —3— is a bottom plan view of the same.

Fig. —4— is a fragmentary detail longitudinal section of the same on the line 4—4 of Fig. —3—, a part of an adjusting sleeve being broken away to more fully illustrate the construction.

Fig. —5— is a fragmentary detail vertical longitudinal section on the line 5—5 of Fig. —4—.

Figs. —6— and —7— are respectively a view in end elevation and a plan view of a part of the adjusting means associate with the guide-ways or rails for the carriage.

Fig. —8— is a bottom plan view of the carriage for the lens board and the guide-ways therefor.

Figs. —9— and —10— are respectively detail central vertical sections of the same on the lines 9—9 and 10—10 of Fig. —7—.

Fig. —11— is a fragmentary detail sectional view on the line 11—11 of Fig. —5—.

Fig. —12— is a detail sectional view on the line 12—12 of Fig. —3—.

Fig. —13— is a bottom plan view of the set-screw and thumb-nut thereon shown in section in Fig. —12—.

Figure 1:
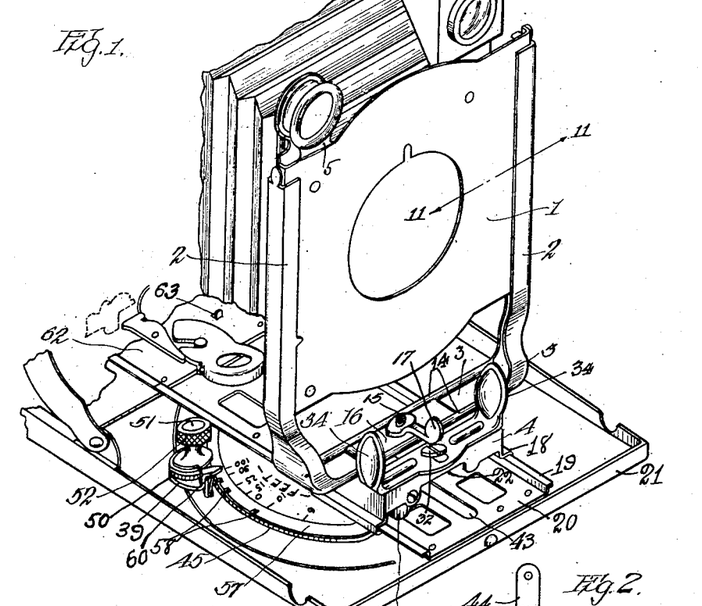
Figure 2:
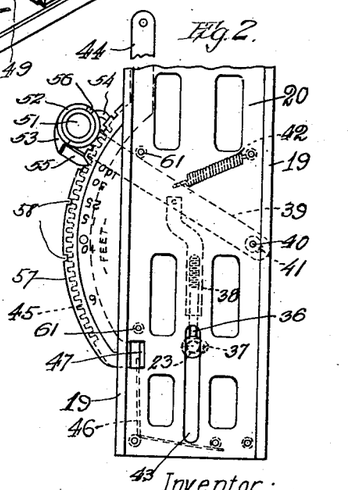

Referring primarily to Fig. —1—, of the drawings it will be seen that the lens board 1 of the camera is vertically movable in the guides 2 constituting the arms of a U-shaped member, the middle portion 3 of which is laterally movable on the carriage 4. The said carriage and said portion 3 of said carriage are equipped with co-acting guides for said U-shaped guide member, the latter being adapted to be held in any position relative to the carriage by means of the usual and well-known clutch device particularly illustrated in Fig. 10. Secured to the rear face of the said lens board are two strips of metal, one of which is rigid with said lens board 1.

The top plate of the carriage 4 is provided with parallel transverse concavo-convex ribs 13 which engage in the concave portions of ribs 14 on the middle portion 3 of the U-shaped lens-board carrying member 2 whereby to guide said member on said carriage. In the middle portion of said member 3 is a longitudinal slot through which the shank 15 of an inverted set screw projects, the latter projecting similarly through the opening in a plate 16 slidably mounted on the portion 3 of the lens board carrier and passing also through an opening in the upper wall of the carriage 4, the upper projecting end of said set screw 15 engaging in the threaded opening in one end hub-portion of a lever 17, which is adapted to be rotated to cause said member 3 to be firmly clamped between the plate 16 and the top plate of the carriage 4.

The said carriage 4 consists practically of a rectangular receptacle devoid of a bottom wall and provided at the lower edges of its side walls with overhanging guide flanges 18 for engaging the outwardly extending flanges 19 of the guide-way or rail 20. The latter consists of two parts one of which is carried by the hinged plate 21 for closing the forward end of the camera housing and the other of which is rigidly mounted upon the bottom wall of said housing and is alined with the portion carried by said plate 21 when the latter is moved to its open position. The said guide flanges 18 of the said carriage and the body of the latter similarly are preferably made of relatively great length so as to prevent binding of the guides upon each other to prevent free movement of the carriage 4, it being desirable that said carriage shall be freely and quickly movable on its guides in order to rapidly effect a primary adjustment of the lens board when it is desired to photograph an object and to make this operation as easy as possible for the user.

Figures 3, 8, 9, 10, 11:
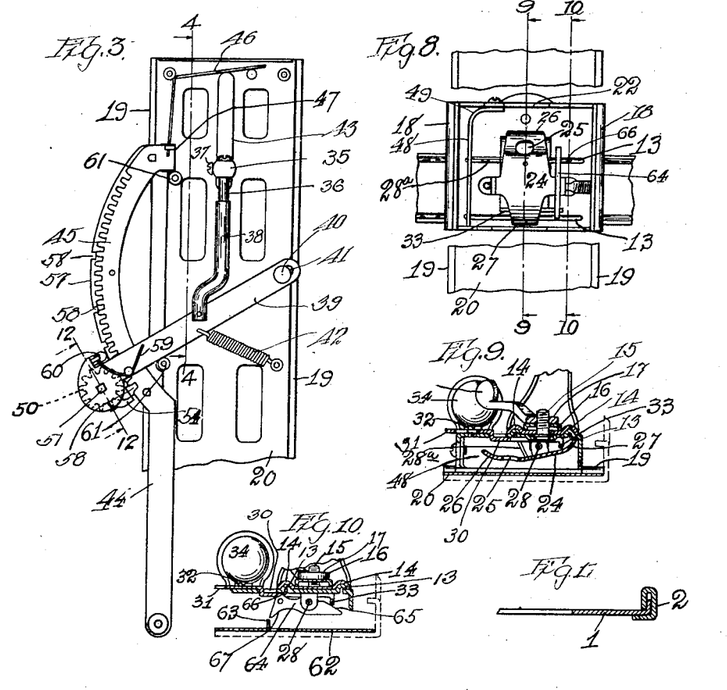
Figure 4:
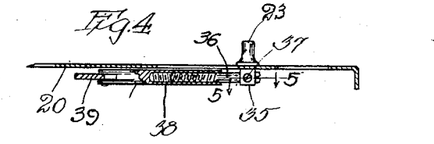
Figure 5:
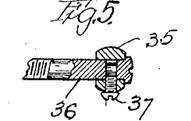
Figure 6:
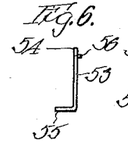
Figure 7:
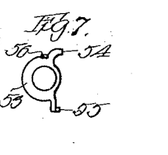

The front wall of the carriage is provided with a recess 22 through which the stop 23 is adapted to pass, the latter being disposed midway between the side edges of the guide member 20. Within said carriage 4 there is pivotally mounted between its ends and to the upper wall of said carriage, by means of a shaft 28, a rocking member 24 provided contiguous its forward end with a perforation 25 adapted to receive the upper end portion of the stop 23, and which is provided forward of said opening or perforation 25 with a projecting tongue or lip 26 adapted to slide freely over the said stop 23 when contacting with the latter to enable the same to spring into and engage in said opening 25. The other end of said rocking member terminates in a lip or tongue 27 adapted to engage the upper wall of the carriage 4 for limiting the downward movement of the tongue or lip 26, to maintain the same normally at the desired elevation. A spring 28ª is engaged at one end in the concave portion of one of the guide ribs in the top wall of the carriage and which bears at its other end upon the forward end portion of the member 24 for normally holding said member in the position shown in Fig. 11. In the upper wall of said carriage 4 midway between the side edges thereof is a longitudinal slot through which the tongue 30 of a sliding member 31 projects, the latter resting upon the top wall of said carriage and said tongue 30 being offset downwardly from the upper portion of said member and contacting with the lower face of the top wall of the carriage. The middle portion of said member 31 extends transversely to the respective end portions thereof. The outer or upper portion of said member 31 is provided midway between its side edges with a longitudinal slot through which the shank of a set screw 32 passes, said slot and set screw coacting with the tongue 30 and the slot through which the same projects, for guiding said member 31 in its reciprocal movements on said carriage 4. Said tongue 30 terminates at its inner end in a downwardly extending projection 33 in the path of which the projection 27 of the rocking member 24 is normally disposed as shown in Fig. 11, the upper face of said projection 27 being inclined so that upon moving said member 31 toward the rear wall of said carriage 4 said projection 33 will depress the projection 27 thereby causing the other end of said rocking member to be raised to release the stop 23 from engagement in the recess 25. The said member 30 is provided at its side edges with upwardly projecting opposed and dished digitally engageable projections 34 in which the finger tips are adapted to readily engage for imparting movement to said member relative to the carriage in one direction and to the carriage 4 in both directions.

The stop 23 is provided with a downwardly extending projection 35 through which the shank 36 of a set screw passes; said shank being provided with an annular groove in which the inner end of a small setscrew 37 in said projection 35 engages, the latter performing the two functions of permitting rotation of said set screw 36 relative to said projection 35 and of clamping said set screw 36 against rotation relative to said projection. The threaded end of said shank of said set screw 36 engages in the threaded sleeve 38 which is pivotally engaged with a lever 39 between the ends of the latter. Said lever 39 is pivotally engaged with the lower face of the guide-member 20 at one end and projects outwardly beyond the opposite side edge of said guide. The pivotal connection of said lever 39 with said guide is effected contiguous to one side edge thereof by means of a rivet 40 or the equivalent, the shank of which projects through the longitudinal slot 41 in one end of said lever whereby the latter is not only capable of pivotal movement relative to said guide, but also of limited longitudinal movement relative to the same. A helical tension spring 42 serves to maintain said lever 39 normally at one limit of its pivotal movement and normally also at the inner limit of its movement relative to the guide member 20. The middle portion of the projection 23 passes through a longitudinal slot 43 midway between the side edges of the guide 20 and is adapted to be moved to any position between the ends of said slot by imparting a pivotal movement to the lever 39, as will be obvious.

Pivotally secured at one end to the lower face of said guide member 20 is a lever 44, one end portion of which is curved and constitutes a rack-bar 45 which, when said lever is positioned at the inner limit of its pivotal movement relative to said guide 20, is disposed concentric with the rivet 40. The said outer or free end portion of said lever 44 is normally maintained at the inner limit of its movement by means of a spring 46, the said end of said lever terminating in an upwardly extending projection 47 projecting through a slot in the guideway 20. The said projection 47 is disposed in the path of a cam member or rail 48 in the carriage, said rail being for the most part disposed parallel with and contiguous to one of the side walls of said carriage 4 and the forward end portion thereof being curved or deflected, as at 49, to extend away from the said contiguous side wall of the carriage 4. The front wall of the carriage 4 is provided with a recess for the passage of the projection 47, the latter being normally disposed in the path of the curved or deflected portion 49 of the said cam rail 48 and being adapted, as the carriage is moved forward for causing the stop 23 to become engaged in the opening 25 of the rocking member 24, to be thrown to the outer limit of its movement in the slot in the guide-member through which said projection passes, thereby throwing the said rack bar 45 into position concentric with the rivet 40.

Rotatably mounted upon the outer end portion of the lever 39 is a spur pinion 50 which is adapted to mesh with the said rack-bar 45 when the lever 44 is disposed at the outer limit of its pivotal movement. The said spur pinion is rotatable upon the inner end of a stud 51 rigidly mounted on said lever 39, the outer end of which is threaded to receive the knurled thumb nut 52. Between the base of the latter and said spur pinion 50 there is interposed a collar or rocking member 53 which is provided with a projecting arm 54 at one side, and an arm provided with a downwardly extending L-shaped projection 55 at an opposite side, and also with a small upwardly extending projection 56, which latter is normally disposed in a recess in the periphery of the base of the nut 52.

The latter is provided with a central annular flange 52ª which passes through and is of very slightly greater length than the thickness of the member 53 so that when said nut 52 is turned to clamp the spur-pinion rigid with said lever, said member 53 will still be freely rotatable.

It will be seen that the slot 41 in said lever 39 permits the latter a limited longitudinal movement and that the spring 42 is so arranged as to normally maintain said lever at the inner limit of its longitudinal movement as well as at one limit of its pivotal movement. The purpose of this slot 41 is to permit the lever 44 to be moved outwardly by the carriage against the action of said spring 46 even though the teeth of the rack 45 and spur pinion 50 should not be disposed in such relative position as to mesh with each other at the instant that said rack moves outwardly into meshing relation to the pinion. It also compensates for any slight inaccuracy in the position of the pivot of said lever 44 or in the curvature of the rack 45.

Rigid with the rack bar and concentric therewith is a segmental plate 57 provided at intervals with notches or recesses 58 in which the said arm 54 of said collar 53 is adapted to engage for holding the lever at any point in its pivotal movement corresponding to the several notches 58 in said plate. The said L-shaped projection 55 of said member 53 engages one arm of a small spring 59 mounted upon the lever and which normally maintains the said arm 54 in engagement with or engaging relation to the said notches 58, the same being adapted to be released from engagement with the latter by rotating the said set screw 52 relatively to the lever 39 in one direction.

The recess in the base of the nut 52 in which the said projection 56 normally engages serves to limit the rotation of the said nut in one direction, and permits the rocking of the said member 53 against the action of said spring 59, said recess permitting the said nut to be rotated through an arc sufficient to clamp the spur pinion 50 against rotation, whereby to hold the lever 39 at any desired point between the limits of its movement independently of the engagement of the projection 54 in a notch of the plate 57.

The outer edge of the segmental plate 57 is so positioned when the lever 44 is disposed at the outer limit of its movement, that the notches 58 are disposed in engaging relation to the projection 54, said notched edge-portion thereof being slightly offset upwardly from the body of said plate so as not to interfere with the free rotation of said gear. The metal of which said collar 53 is made is thicker than that of the segmental plate 57 so that the upper surface of the former and that of the edge portion of the latter are flush with each other, whereby the said projection 54 will be at all times disposed in engaging relation to the notches 58.

The said edge portion of segmental plate is provided with a graduated scale, the divisions of which are numerically designated to indicate the proper position of the lens board of the camera for photographing an object disposed at the number of feet from the camera corresponding to the numeral indicating each particular division. The lever 39 is provided with a pointer arm 60 which indicates on said graduated scale, the notches 58 being so disposed relative to the pointer arm and the arm 54 of the rocking member 53 as to cause the said projection 54 to engage in a notch as the pointer arm or indicating hand registers with one of the graduations of said scale.

On the lower face of the said guide-way 20 are two stop projections disposed in the path of the lever 39 for limiting the pivotal movement of the latter, one of said projections 61, being disposed to cause the lever to become normally positioned to fix the position of the stop 23 so that upon engagement of the latter in the opening in the rocking member 24 the lens board will be positioned to photograph an object at the maximum focal range of the camera which, in the instance illustrated, is one hundred feet. The normal position of the lever 44 is such that the said spur-pinion 50 is incapable of meshing with the rack thereof, but as soon as the carriage is moved to a position at which the projection 47 has been moved by the curved or deflected portion 49 of the cam rail 48 said rack-bar will be thrown into mesh with said spur pinion and this, it will be noted, will occur simultaneously, or substantially simultaneously, with the engagement of the stop 23 in said opening 25. This movement will at the same time throw the projection 54 of the member 53 into the proper notch 58 in the plate 57 thereby effectually locking the lever 39 against pivotal movement.

As soon as the stop has been engaged with said rocking member 24 the carriage 4 may be adjusted to bring the lens board into position, determined by the distance from the camera of the object to be photographed, by pivotally moving said set screw 52 to throw the projection 54 out of engaging relation to the notches in said plate 57. As the indicating hand registers with the desired graduation of the scale the set screw 52 is released, whereupon the projection 54 will engage in the proper notch 58 to maintain the carriage in the desired position.

After the photograph has been taken and it is desired to again close the camera the members 34 are engaged by the thumb and index or middle finger of one hand and moved toward the camera body, thereby automatically disengaging the member 24 from engagement with the stop 23, thus permitting the carriage to be moved back to its inner limit preparatory to closing the door or plate 21 carrying the guide rail 20. As soon as the carriage has been moved to permit the projection 47 to pass the curved or deflected portion 49 of the cam rail 48, the lever 44 will be moved by its actuating spring to the inner limit of its movement, thereby withdrawing the rack out of mesh with the spur pinion. By this movement the projection 54 will also be thrown out of engaging relation to the notches 58 and, the lever 39 thus being released, will instantly move back to its normal position by the action of its engaging spring 42.

In order that the levers 39 and 44 may swing freely on their pivots the guide-way or rail 20 is supported at an elevation above the opposing surface of the plate 21, and, in order that the outer end of said lever 39 may not be accidentally depressed by the operator so as to throw the spur-pinion 50 out of mesh with the rack 45, and the member 53 so that its projection 54 is out of engaging relation to the notches in the plate 57, I provide on said plate 21 a supporting rail 61 for the said outer end portion of said lever 39, said rail consisting preferably of wire mounted upon the plate 21 in any suitable manner and projecting the requisite distance from the face thereof opposing the supported face of said lever 39.

Figure 12:
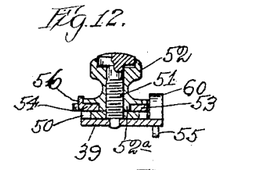
Figure 13:
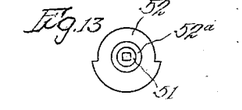

When the said carriage 4 is moved to the rearward limit of its movement to be disposed within the camera-housing and upon that portion 62 of its guide-way 20 which is mounted upon the bottom wall of said housing, it is desirable that said carriage should be held against accidental outward movement to a position interfering with closure of the plate or door 21, and, to this end I provide on the last-named portion 62 of said guide-way, a projection 63 which is disposed in the path of a dog 64 pivotally mounted between its ends on the shaft 28 in the carriage 4. The said dog is provided at its rear end with an upper inclined edge 65, the plane of which intersects the plane of the tongue 27 of the rocking-member 24 to one side of which said dog is disposed, said inclined edge 65 being maintained normally in engagement with the flange or projection 33 of the member 30 by means of a spring 66 engaged at one end with the upper wall of the carriage in the same manner and in the same groove as said spring $28^a$ and engaged at its other end in a perforation in the forward end of said dog 64. The lower edge 67 of the last-named end portion of said dog is inclined to ride over the said projection 63 as the carriage 4 approaches the rearward limit of its movement, thereby causing the forward end of said dog to become disposed behind and in engagement with said projection 63 as the carriage 4 reaches the rearward limit of its movement thus holding the latter against being forced forward by expansion of the bellows or in any other manner. Until and after the carriage 4 reaches the last-named position the member 30 will remain at or near the rearward limit of its movement as the springs $28^a$ and 66 and the inclined surface of the projection 27 and the inclined edge 65 of the dog will act against each other to so hold said member 30. But as the projections 34 of the latter are engaged preparatory to moving the carriage 4 forward, the initial movement of said member will be to the forward limit of its movement relatively to the carriage as clearly shown in Fig. —12— and during this initial forward movement the rear end portion of the dog 64 will be depressed thus raising the forward end thereof above the upper edge of the projection 63 whereby the carriage 4 is enabled to move forward. This movement of the member 30 also permit the rocking member 24 to attain the position shown in Fig. —11— so that as the carriage reaches the forward limit of its movement said member 24 will receive the said stop 23, as previously described.

I claim as my invention:

1. In a photographic camera, a lens-board carriage having guide flanges, a guide rail on which the same is freely reciprocably movable, a stop for said carriage, a member carried by the latter for engaging said stop to prevent reciprocable movement of said carriage, and a member mounted upon and movable relatively to said carriage adapted to be digitally engaged to move the latter on its guides, said last-named member operatively engaged with said first-named member for throwing the latter out of engaging relation to said stop when moved in one direction relatively to said carriage.

2. In a photographic camera, a lens-board carriage having guide flanges, a guide rail on which the same is freely reciprocably movable, a stop for said carriage, a member carried by the latter and normally yieldingly held in engaging relation to said stop and adapted to automatically engage the same as said carriage is moved in one direction for holding the latter against movement relatively to its guides, and a member mounted upon and movable relatively to said carriage adapted to be digitally engaged to move the latter on its guides, said last-named member operatively engaged with said first-named member for throwing the latter out of engaging relation to said stop when moved in one direction relatively to said carriage.

3. In a photographic camera, a lens-board carriage freely movable on a guide rail therefor, a stop for said carriage, stop engaging means movably mounted on said carriage and normally yieldingly held in engaging relation to and adapted to automatically engage said stop as said carriage is moved in one direction for locking the same against movement relatively to its guides, means mounted upon and movable relatively to said carriage adapted to be digitally engaged to reciprocate the latter, said last-named means operatively engaged with the first-named for automatically disengaging the same from said stop as movement is imparted to said digitally engageable means to move said carriage in one direction.

4. In a photographic camera, a lens-board carriage freely movable on a guide rail therefor, a stop for said carriage, a rocking member mounted on said carriage and having means for engaging said stop for holding said carriage against movement relatively to its guides, digitally engageable means movably mounted on said carriage for imparting movement to the latter, said means operatively engaged with said member for automatically disengaging the same from said stop as movement is imparted to the said means to move said carriage in one direction.

5. In a photographic camera, a lens-board carriage freely movable on a guide rail therefor, a stop for said carriage, a rocking member mounted on said carriage and having means for engaging said stop for holding said carriage against movement relatively to its guides, digitally engageable means movably mounted on said carriage for imparting movement to the latter, said means operatively engaged with said member for automatically disengaging the same from said stop as movement is imparted to the said means to move said carriage in one direction, and a spring for normally maintaining said member and said means at one limit of their respective movements.

6. In a photographic camera, a lens-board carriage freely movable on a guide rail therefor, a stop for said carriage, a rocking member mounted on said carriage and having means for engaging said stop for holding said carriage against movement relatively to its guides, digitally engageable means reciprocably movable on said carriage and adapted to impart movement to the latter, said means operatively engaged with said member for automatically disengaging the same from said stop as movement is imparted to the said means to move said carriage in one direction.

7. In a photographic camera, a lens-board carriage freely movable on a guide rail therefor, a stop for said carriage, a rocking member mounted on said carriage and having means for engaging said stop for holding said carriage against movement relatively to its guides, digitally engageable means reciprocably movable on said carriage and adapted to impart movement to the latter, said means operatively engaged with said member for automatically disengaging the same from said stop as movement is imparted to the said means to move said carriage in one direction, and a spring for normally maintaining said member and said means at one limit of their respective movements.

8. In a photographic camera, a lens-board carriage freely movable on a guide rail therefor, a stop for said carriage, a rocking member mounted on said carriage and having means for engaging said stop for holding said carriage against movement relatively to its guides, digitally engageable means reciprocably movable on said carriage in the direction of movement of the latter on its guides, and adapted to impart movement to the latter, said means operatively engaged with said member for automatically disengaging the same from said stop as movement is imparted to the said means to move said carriage in one direction.

9. In a photographic camera, a lens-board carriage freely movable on a guide rail therefor, a stop for said carriage, a rocking member mounted on said carriage and having means for engaging said stop for holding said carriage against movement relatively to its guides, digitally engageable means reciprocably movable on said carriage in the direction of movement of the latter on its guides, and adapted to impart movement to the latter, said means operatively engaged with said member for automatically disengaging the same from said stop as movement is imparted to the said means to move said carriage in one direction, and a spring for normally maintaining said member and said means at one limit of their respective movements.

10. In a photographic camera, a lens-board carriage freely movable on a guide rail therefor, a stop for said carriage, a spring-held rocking member pivotally mounted between its ends on said carriage and having a perforation in one end to receive said stop, the respective end portions thereof angularly disposed relatively to each other and affording cam-surfaces one of which is adapted to be engaged by said stop to automatically spring the latter into said perforation to lock said carriage against movement on its guides, and a digitally engageable member movably mounted on said carriage and operatively engaged with the other of said cam surfaces of said rocking member for disengaging the latter from said stop preparatory to moving said carriage in one direction.

11. In a photographic camera, the combination with a lens-board carriage and a guide rail therefor, of a stop for said carriage movable relatively to said guide rail, means on said carriage for automatically engaging and disengaging said stop as said carriage is moved in respectively opposite directions, and a manually operable lever associated with said stop for moving the latter and said carriage relatively to said guide rail.

12. In a photographic camera, the combination with a lens-board carriage and a guide rail therefor, of a stop for said carriage movable relatively to said guide rail, means on said carriage for automatically engaging and disengaging said stop as said carriage is moved in respectively opposite directions, a manually operable lever associated with said stop for moving the latter and said carriage relatively to said guide rail, a spring engaged with said lever for normally holding the latter and said stop in a predetermined position relatively to said guide rails, and coacting means on said lever and said guide rails for holding said lever at any desired point between the limits of its movement.

13. In a photographic camera having a movable lens-board carriage, means for adjusting the position of said carriage including a member adapted to be operatively engaged with the same, an oscillating lever operatively engaged with said member to reciprocate the same, coacting means concentric with the pivot of said lever and means on the latter adapted to engage the same, for holding said lever at any desired point between the limits of its movement.

14. In a photographic camera having a movable lens-board carriage, and a guide therefor, means interposed in said guide and adapted to engage said carriage for holding the same against movement, a lever associated with said means for moving the same and said carriage relatively to said guide, and means associated with said lever for holding the latter at any desired point between the limits of its movement.

15. In a photographic camera having a movable lens-board carriage, and a guide therefor, means interposed in said guide and adapted to engage said carriage for holding the same against movement, a spring-held lever associated with said means for moving the same and said carriage relatively to said guide, and means associated with said lever for holding the latter at any desired point between the limits of its movement against the action of the spring holding the same.

16. In a photographic camera having a movable lens-board carriage and a guide therefor, a stop positioned in the path of said carriage, means on the latter for engaging the same with said stop to hold said parts against relative movement, and means associated with said stop for moving the same and said carriage relatively to said guide.

17. In a photographic camera having a movable lens-board carriage and a guide therefor, a stop positioned in the path of said carriage, means on the latter for engaging the same with said stop to hold said parts against relative movement, and means associated with said stop for moving the same and said carriage relatively to said guide, a spring associated with said last-named means for normally holding said stop at one limit of its movement, and mechanism for holding said means and said stop at any desired point between the limits of their movement against the action of said spring.

18. In a photographic camera having a movable lens-board carriage and a guide therefor, a stop positioned in the path of said carriage, means on the latter for engaging a manually operable element on said carriage for releasing the same from engagement with said stop, means associated with the latter for moving the same and said carriage relatively to said guide, a spring associated with said last-named means for normally holding said stop at one limit of its movement, and mechanism associated with said last-named means for holding the said stop at any desired point between the limits of its movement, said mechanism including a part controlled by the carriage for determining its coactive position with relation to the other parts of said mechanism.

19. In a photographic camera having a movable lens-board carriage and a guide therefor, a stop positioned in the path of said carriage, means on the latter for engaging a manually operable element on said carriage for releasing the same from engagement with said stop, means associated with the latter for moving the same and said carriage relatively to said guide, a spring associated with said last-named means for normally holding said stop at one limit of its movement, and mechanism associated with said last-named means for holding the said stop at any desired point between the limits of its movement, said mechanism including a spring-actuated part controlled by the carriage for determining its coactive position with relation to the other parts of said mechanism.

20. In a photographic camera having a lens-board carriage and a guide therefor, a stop disposed in the path of the carriage, manually controlled means on the latter for engaging the same with said stop, mechanism for moving said stop and carriage relatively to said guide a member associated with said mechanism for engaging the latter to hold said stop at any point between the limits of its movement, inter-engaging means on said member and said carriage for throwing the latter into engaging relation to said mechanism as said carriage becomes engaged with said stop, and springs for normally holding said member and said stop at one limit of each of their respective movements, whereby when said carriage is moved relatively to said stop the said member will automatically move out of engaging relation to said mechanism and permit said stop to automatically return to its normal position.

21. In a photographic camera, a lens-board carriage and guide therefor, a stop positioned in the path of said carriage, manually controlled stop-engaging means on said carriage, means for moving said stop and carriage relatively to said guide, a cam on said carriage, a member disposed in the path of said cam and adapted to be moved and held out of its normal position as said carriage is engaged with said stop, and mechanism on said means for moving said stop adapted to engage said member when the latter is moved from its normal position for holding said stop at any desired point between the limits of its movement.

22. In a photographic camera, a lens-board carriage and guide therefor, a spring-held stop positioned in the path of said carriage, manually controlled stop-engaging means on said carriage, means for moving said stop and carriage relatively to said guide, a cam on said carriage, a spring-held member disposed in the path of said cam and adapted to be moved and held out of its normal position as said carriage is engaged with said stop, and mechanism on said means for moving said stop adapted to engage said member when the latter is moved from its normal position for holding said stop at any desired point between the limits of its movement against the action of its spring.

23. In a photographic camera having a lens-board carriage and a guide therefor, means adapted to be engaged with said carriage as the latter moves outwardly from the camera body for primarily holding the same in a predetermined position for a given focal range of the instrument, mechanism associated with said means for effecting adjustment of the latter and said carriage relatively to the camera body to vary said focal range, said mechanism including two relatively movable members equipped with coacting interengaging means for holding the same in various relative positions, one of said members normally out of engaging relation to the other and adapted to be moved into and held in engaging relation thereto by said carriage as the latter is engaged with said means.

24. In a photographic camera having a lens-board carriage and a guide therefor, means adapted to be engaged with said carriage as the latter moves outwardly from the camera body for primarily holding the same in a predetermined position for a given focal range of the instrument, a spring engaged with said means for normally holding the latter at one limit of the movement thereof, mechanism associated with said means for effecting adjustment of the latter and said carriage relatively to the camera body to vary said focal range, said mechanism including two relatively movable members equipped with coacting interengaging means for holding the same in various relative positions, one of said members normally out of engaging relation to the other and adapted to be moved into and held in engaging relation thereto by said carriage as the latter is engaged with said means.

25. In a photographic camera having a lens-board carriage and a guide therefor, means adapted to be engaged with said carriage as the latter moves outwardly from the camera body for primarily holding the same in a predetermined position for a given focal range of the instrument, a spring engaged with said means for normally holding the latter at one limit of the movement thereof, mechanism associated with said means for effecting adjustment of the latter and said carriage relatively to the camera body to vary said focal range, said mechanism including two relatively movable members equipped with coacting interengaging means for holding the same in various relative positions, one of said members spring-held normally out of engaging relation to the other and adapted to be moved into and held in engaging relation thereto by said carriage as the latter is engaged with said means.

26. In a photographic camera having a lens-board carriage and a guide therefor, means adapted to be engaged with said carriage as the latter moves outwardly from the camera body for primarily holding the same in a predetermined position for a given focal range of the instrument, a spring engaged with said means for normally holding the latter at one limit of the movement thereof, mechanism associated with said means for effecting adjustment of the latter and said carriage relatively to the camera body to vary said focal range, said mechanism including two relatively movable members equipped with coacting interengaging means for holding the same in various relative positions, one of said members spring-held normally out of engaging relation to the other and adapted to be moved into and held in engaging relation thereto by said carriage as the latter is engaged with said means, said spring-held member adapted to move out of engaging relation to the other as said carriage is released from engagement with and moved relatively to said means, whereby the latter will automatically return to normal position.

27. In a photographic camera having a lens-board carriage and guide therefor, means adapted to be engaged with the said carriage for moving the latter relatively to the body of the camera to vary the focal range thereof, a spring for normally holding said means at one limit of the movement thereof, mechanism associated with said means for holding the latter at any point between the limits of its movement against the action of said spring, said mechanism including two interengaging parts one of which is normally maintained out of engaging relation to the other, and interengaging means on the first-named part and said carriage for throwing said part into engaging relation to the other as said carriage engages said means.

28. In a photographic camera having a lens-board carriage and a guide therefor, a member movable longitudinally relatively to said guide, means on said carriage for engaging the latter with said member, a rocking lever engaged with the latter for reciprocating the same, a rack adapted to be disposed concentric with the pivot of said lever and movable laterally of said guide, a spur-pinion on said lever adapted to mesh with said rack, means on said lever for clamping said pinion against rotation for holding said lever at any point between the limits of its pivotal movement, and interengaging means on said rack and said carriage for throwing the former into engaging relation to said pinion as the latter moves into engagement with said member.

29. In a photographic camera having a lens-board carriage and a guide therefor, a member movable longitudinally relatively to said guide, means on said carriage for engaging the latter with said member, a rocking lever engaged with the latter for reciprocating the same, a spring normally maintaining said lever at one limit of its pivotal movement, a rack adapted to be disposed concentric with the pivot of said lever and movable laterally of said guide, a spur-pinion on said lever adapted to mesh with said rack, means on said lever for clamping said pinion against rotation for holding said lever at any point between the limits of its pivotal movement, and interengaging means on said rack and said carriage for throwing the former into engaging relation to said pinion as the latter moves into engagement with said member, and a spring engaged with said rack to normally maintain the latter out of engaging relation to said pinion.

30. In a photographic camera, the combination with means adapted to engage the lens-board carriage, of mechanism for positioning said means and the carriage engaged therewith for varying the focal range of the instrument, said mechanism including means for automatically returning said mechanism to a predetermined position from any position to which it has been moved upon effecting release from and a movement of said carriage relatively to said mechanism.

31. In a photographic camera having a lens-board carriage and a guide therefor, a member movable longitudinally relatively to said guide, means on said carriage for engaging the latter with said member, a rocking lever engaged with the latter for reciprocating the same, a segmental member adapted to be disposed concentric with the pivot of said lever and provided along its concentric edge with means for effecting engagement with another part, a part carried by said lever for engaging said segmental member for holding said lever at any point between the limits of its movement, a spring normally maintaining said segmental member out of engaging relation to said part, and interengaging devices on said segmental member and said carriage for throwing the former into engaging relation to said part on said lever as said carriage moves into engagement with said means.

32. In a photographic camera having a lens-board carriage and a guide therefor, a member movable longitudinally relatively to said guide, means on said carriage for engaging the latter with said member, a rocking lever engaged with the latter for reciprocating the same, a spring normally maintaining said lever at one limit of its pivotal movement, a segmental member adapted to be disposed concentric with the pivot of said lever and provided along its concentric edge with means for effecting engagement with another part, a part carried by said lever for engaging said segmental member for holding said lever at any point between the limits of its movement, a spring normally maintaining said segmental member out of engaging relation to said part, and interengaging devices on said segmental member and said carriage for throwing the former into engaging relation to said part on said lever as said carriage moves into engagement with said means.

33. In a photographic camera, lens-board carriage adjusting mechanism comprising spring-held means adapted to be engaged with the lens-board carriage and adapted to be manually actuated to move the latter to any desired position, a spring-held member associated with said means, the latter and said member equipped with interengaging devices for holding said means in any desired position against the action of the spring holding the same, said member normally held out of engaging relation to said means, and interengaging parts on said member and said carriage for throwing the former into position to permit said parts to engage each other as said carriage is engaged with said means.

34. In a photographic camera, a lens-board carriage, a guide therefor, a member movable relatively to said guide, means on said carriage for engaging the latter with said member, a pivoted lever connected with said member and capable of limited longitudinal movement relatively to its pivot, a spring engaged with said lever for holding the same normally at one limit of both its pivotal and longitudinal movement, a spur-pinion rotatably mounted on said lever, a segmental rack adapted to be moved into and out of mesh with said pinion, a spring for holding said rack normally out of mesh therewith, a cam on said carriage, and a projection on said rack disposed in the path of said cam and adapted to be engaged thereby to move said rack into mesh with said pin as said carriage moves into engaging relation to said first-named member.

35. In a photographic camera, a lens-board carriage, a guide therefor, stops positioned at the respective end portions of the guide, means on said carriage for engaging said respective stops as said carriage moves to the respective normal limits of its movement, a member movably mounted on said carriage and adapted to be digitally engaged to move the latter on its guide, and means associated with said last-named member and operatively engaged with said respective stop engaging means for effecting release thereof preparatory to moving said carriage.

36. In a photographic camera, a lens-board carriage, a guide therefor, stops positioned at the respective end portions of the guide, means on said carriage for engaging said respective stops as said carriage moves to the respective normal limits of its movement, a member reciprocally movable on said carriage and adapted to be digitally engaged to be first moved relatively to the carriage to one limit of its movement and to thereupon move the latter in the same direction, and means associated with said reciprocable member and operatively engaged with said stop engaging means for releasing the latter from engagement with a stop during the aforesaid movement thereof relatively to said carriage.

In testimony whereof I have signed my name in presence of two subscribing witnesses.

WILLIAM A. PETERS.

Witnesses:
M. M. BOYLE,
R. W. LOTZ.

Copies of this patent may be obtained for five cents each, by addressing the "Commissioner of Patents, Washington, D. C."